No. 679,798. Patented Aug. 6, 1901.
T. L. TINCHER.
COMPUTING SCALE.
(Application filed Apr. 13, 1901.)
(No Model.) 4 Sheets—Sheet 1.
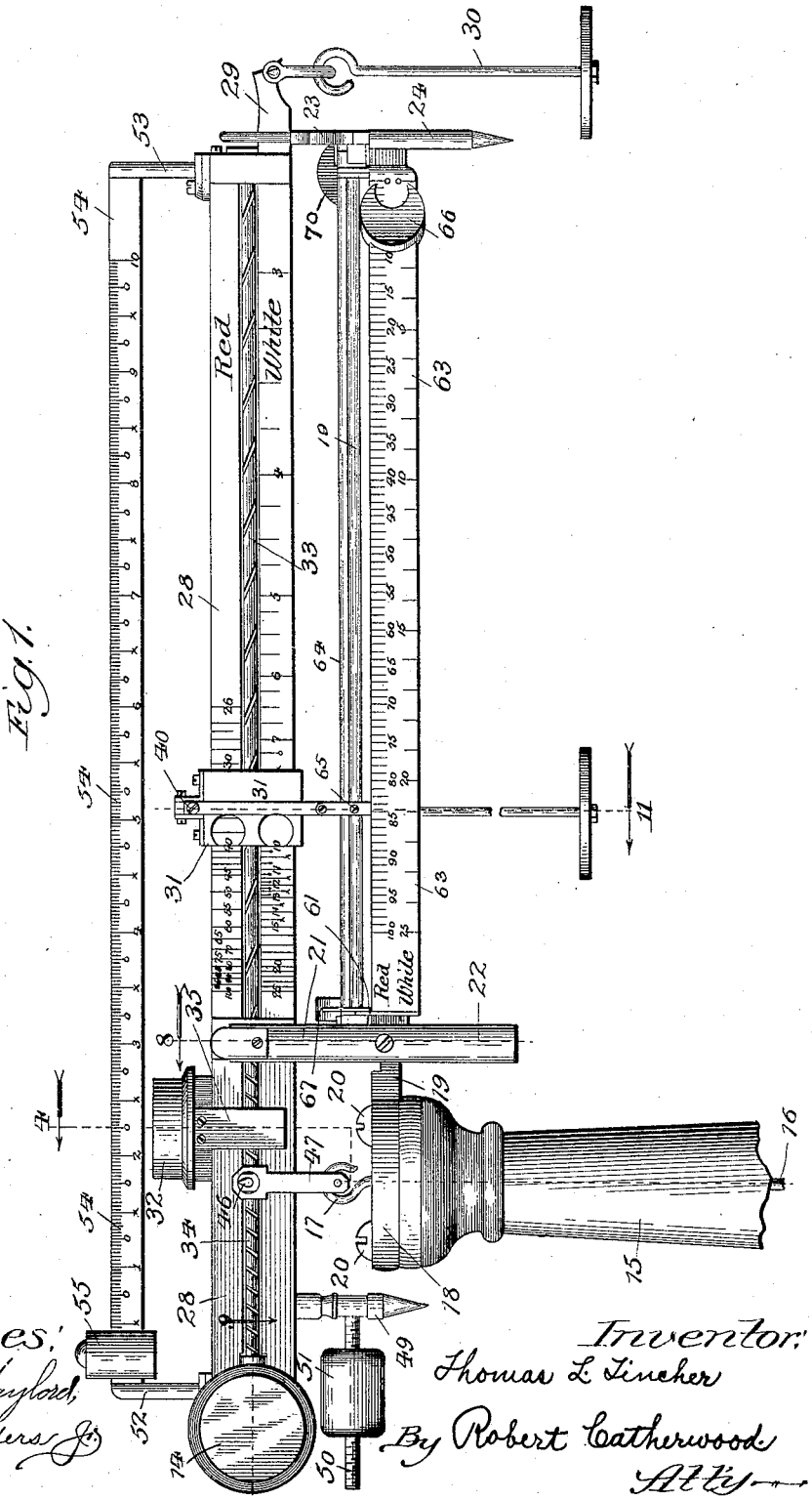

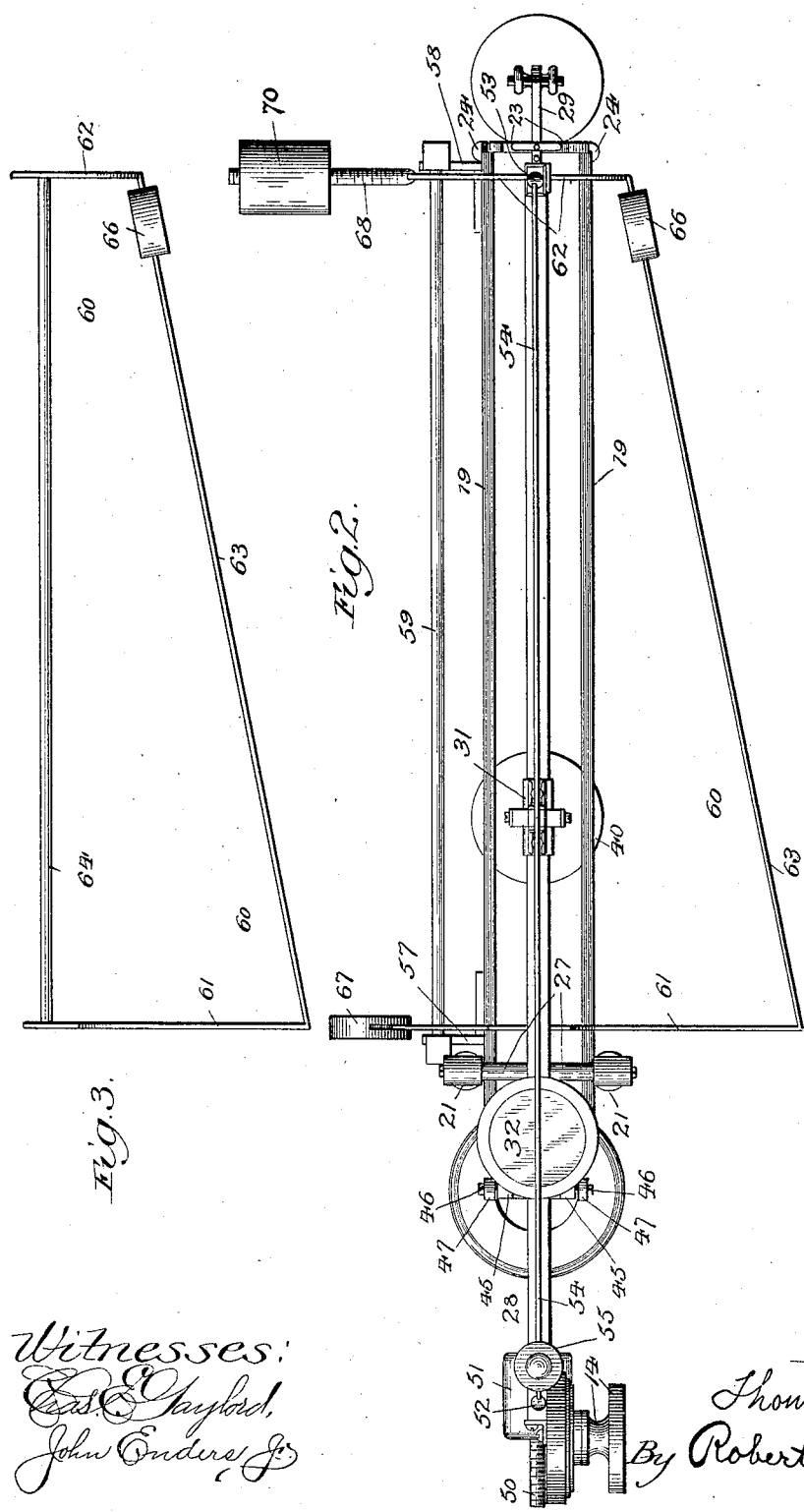

No. 679,798. Patented Aug. 6, 1901.
T. L. TINCHER.
COMPUTING SCALE.
(Application filed Apr. 13, 1901.)
(No Model.) 4 Sheets—Sheet 3.
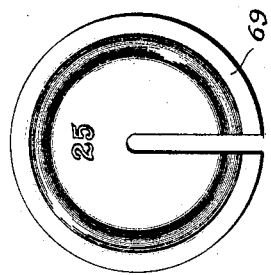
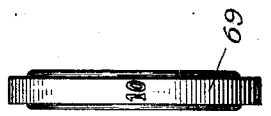
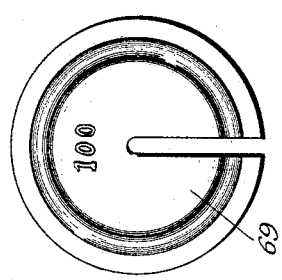
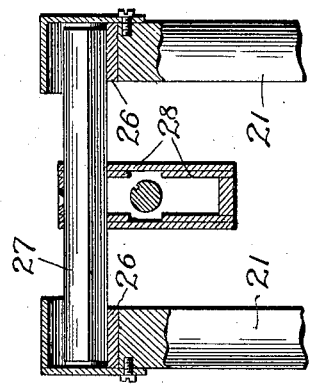
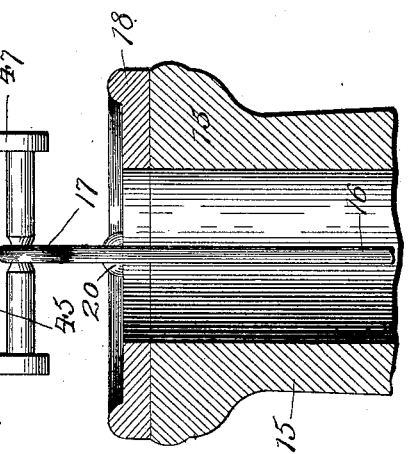
Witnesses:
Inventor:
Thomas L. Tincher
By Robert Catherwood
Atty.
THE NORRIS PETERS CO., PHOTO-LITHO., WASHINGTON, D. C.

No. 679,798. Patented Aug. 6, 1901.
T. L. TINCHER.
COMPUTING SCALE.
(Application filed Apr. 13, 1901.)
(No Model.) 4 Sheets—Sheet 4.
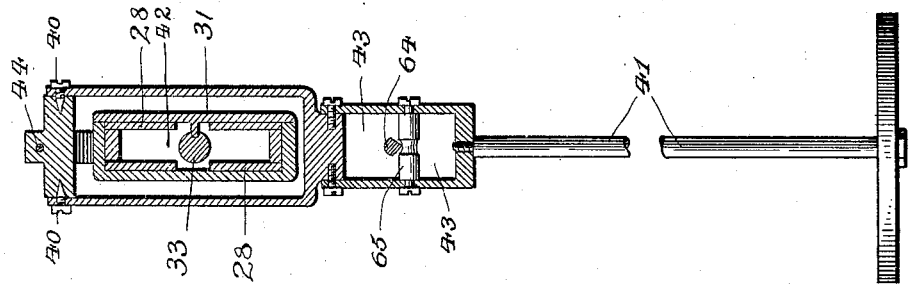
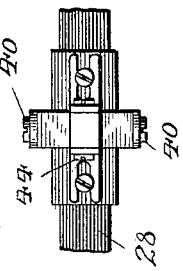
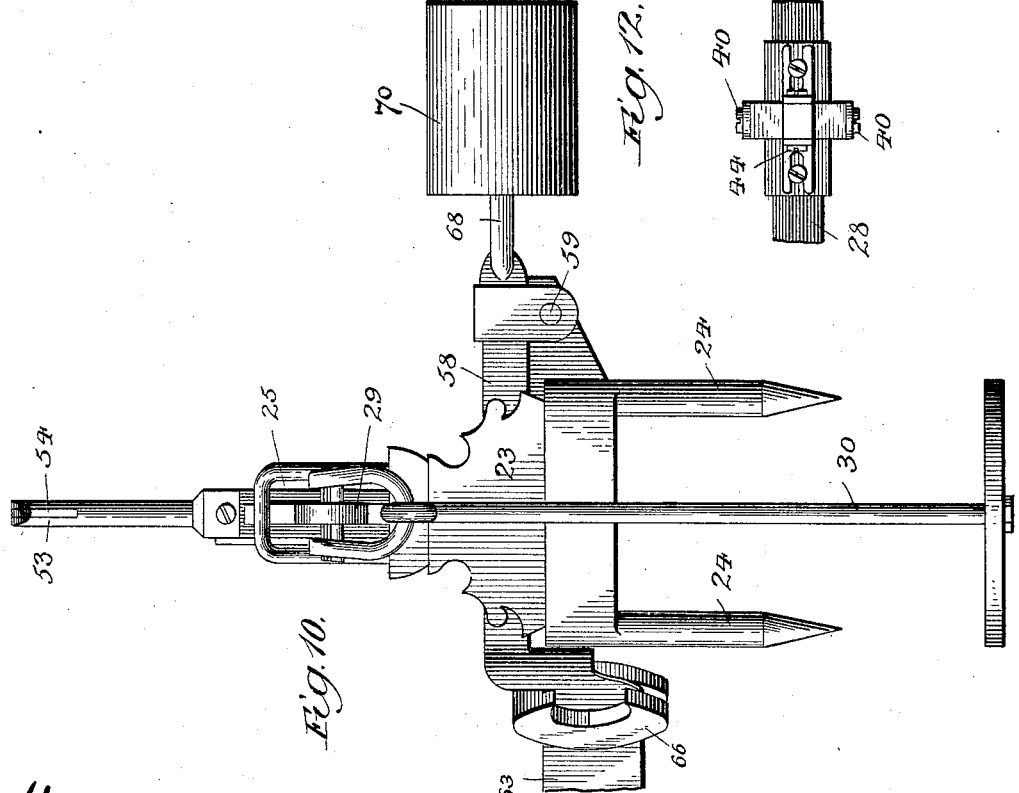
Witnesses:
Chas E Gaylord
John Enders Jr
Inventor:
Thomas L. Tincher
By Robert Catherwood
Att'y

UNITED STATES PATENT OFFICE.

THOMAS L. TINCHER, OF CHICAGO, ILLINOIS, ASSIGNOR TO ARTHUR G. WILMORE, OF SAME PLACE.

COMPUTING-SCALE.

SPECIFICATION forming part of Letters Patent No. 679,798, dated August 6, 1901.

Application filed April 13, 1901. Serial No. 55,737. (No model.)

*To all whom it may concern:*

Be it known that I, THOMAS L. TINCHER, a citizen of the United States, residing at Chicago, in the county of Cook and State of Illinois, have invented certain new and useful Improvements in Computing-Scales, of which the following is a full, clear, and exact description, such as will enable others skilled in the art to which it appertains to make and use the same.

My invention relates to improvements in computing-scales or combined price and weighing scales adapted to give the value of an article at a given price per unit of weight, which price may be varied at the will of the operator or to be set so that the operator may weigh out the exact quantity of goods for a certain sum at a given price per unit.

The object of my invention is to provide a computing-scale accurate and ready of operation, which may be attached to any of the ordinary platform-scales without material alteration, applicable to a wide range of capacities, and simple and economical of construction.

It also consists of many details of construction hereinafter more fully described and claimed.

In the drawings, Figure 1 is a front view of the upper portions of a scale embodying the preferred form of my invention. Fig. 2 is a plan view of the same. Fig. 3 is a detail plan view of the value-beam. Fig. 4 is a detail sectional end view taken on line 4 of Fig. 1. Figs. 5, 6, and 7 are front, side, and rear views of a weight. Fig. 8 is a detail view of the scale-fulcrum, taken on line 8 of Fig. 1. Fig. 9 is a detail plan view of mechanism for rotating the compound screw or worm which drives the slide and its counterweight along the price-beam. Fig. 10 is an end view of the scale from the outer end. Fig. 11 is a detail sectional view of the sliding price-block and attached parts, taken on line 11 of Fig. 1; and Fig. 12 is a detail plan view of the slide upon the price-beam.

As heretofore indicated, the scale is one which can be readily attached and graduated to any of the ordinary platform-scales. In Fig. 1 the part marked 15 is the standard or upright of such a scale, having the rod 16 connected at its lower end to the mechanism of the platform and terminated at its upper end in the hook 17. About the top of the standard, as a base for the weigh-beams, I provide the circular piece 18, preferably of wrought iron or steel, having extending from it the forked arm 19. This base is secured to the upright 15 by means of screws 20 or other suitable mechanism. Rising from the inner end of each fork of arm 19 are uprights 21, having their depending portions 22 finished off in some ornamental manner. The outer ends of the forks are rigidly joined together or united by the ornamental piece 23, having the pendants 24, and in its upper portion a loop or wicket 25.

Pivoted in V-shaped bearings 26 in the upper end of the uprights 21, Fig. 8, is the knife-edge fulcrum-pin 27, having rigidly secured to it the hollow scale-beam 28, forming the price-beam. The outer end 29 passes through the opening 25, heretofore described, and carries the ordinary poise-hanger 30. Slidably mounted on the end of the beam 28 is the price-poise 31, and on the other end is the counterweight 32. This beam 28 is made hollow, as shown in Figs. 4 and 8, and has journaled within it a compound screw or worm, having one portion 33 engaging the block 31 and the other portion 34 engaging the block 35, which is fastened to the counterweight 32. The end of the screw or worm is rigidly secured to a bevel-gear 36, meshing with another bevel-gear 37, journaled in the end of the beam 28 and adapted to be operated by the handle 14, as shown in detail in Fig. 9. The weight of the counterweight 32 and price-poise 31, with attached parts, and the pitches of the screw are so adjusted that when there is no load on the price-poise 31 the handle 14 may be rotated and the counterweight 32 and price-poise 31 moved to and from each other, bringing the poise to any desired position on the beam 28 without destroying the balance.

Attached by pivots 40 to the top of the price-poise 31 is the combination price and value poise 41. As shown in Fig. 11, this poise has in its upper portion an opening 42 to admit of the passage of the beam 28 and opening 43 below to admit of the passage of the rod of the angular beam. This price and value poise can swing lengthwise of the price-beam on the pivots 40 and crosswise on the pivots 44, the pivots 44 being borne upon ears in the top portion of the price-block 31 to permit of the transverse or crosswise rocking motion of the price-poise mounted thereon, while the pivots 40, upon which are mounted the poise-hanger and attached parts, permit of oscillation lengthwise. Fig. 12 shows a plan view of price-block 31 from above, and illustrates the relative positions occupied by the pivots 40 and 44. By this mechanism it is in all positions along the price-beam in engagement with rod 65 and rod 64, hereinafter described. Except for the pivotal connection between counterpoise 31 and price and value poise 41, which is made to allow for side play of the price-beam, the two are one and the same integral piece. While there are advantages in pivoting them as described, they may be made integral with each other without departing from the broad principle of my invention.

Rigidly secured to the bottom of beam 28, at a point directly over the center of the base 18 and upright 15, is the ⌊▃⌋-shaped piece 45. (See Fig. 4.) The arms of this piece 45 clear the beam 28, so that block 35, supporting the counterweight 32, is free to travel along the beam 28 past this piece 45. Extending from the arms of this ⌊▃⌋-shaped piece are fulcrum-arms 46, preferably made of steel, in the form of knife-edges, as shown. Over these knife-edges 46 is the yoke 47, which engages the hook 17 in the manner shown.

Near the short end of the beam 28 is a depending arm 49, having extending from it a screw 50, on which is mounted an adjusting-weight 51. Rigidly secured to the upper side of the beam 28 are posts 52 and 53, which support at their upper ends the tare-beam 54. Slidably mounted on this tare-beam is the tare-poise 55.

Pivotally mounted in V-shaped bearings on arms 57 and 58, Fig. 2, extending back from the rear fork of the frame 19 is a rod 59, having rigidly secured to it the angular beam 60, composed of the two arms 61 and 62 and the value-beam 63 set at an oblique angle to them. As shown, this angular beam is pivoted at the back of the scale by knife-edges extending from arms 61 and 62 and extends through to the front. The angular beam is connected to the price-beam 28 by having the rod 64 attached at its ends to arms 61 and 62, pass through the opening 43 in the price-poise 41, heretofore described, and bear upon the roller bearing or rod 65, as shown in detail in Fig. 11. Slidably mounted on the value-beam is a poise 66. On the rear of the angular value-beam 60 is the fixed counterweight 67 and a screw 68, on which is mounted an adjustable counterweight 70.

The scale is so adjusted that it will balance when all the parts are in the position shown in Fig. 1 and when the counterpoise 31 is at any point on the beam 28. (The effect of moving the block 31 and attached parts is, as heretofore described, overcome by the automatic change in position of the counterweight 32.) The tare-beam 54 is graduated, as shown, so that as the poise 55 is moved along it will weigh directly in pounds in the usual manner, the limit of the scale being here shown as ten pounds. I provide a series of weights 69 of such size, that when placed on the counterpoise 30, they will counterbalance ten pounds on the scale-platform or even multiples of ten pounds. I mark the denominations of these weights on their edges, as shown in Fig. 7. When it is desired to weigh an article of more than ten pounds and have the result in pounds, the article is placed upon the scale-platform. The proper weight from those just described is placed on the holder 30 and the additional weight is read off on the tare-beam 54 in the ordinary manner.

The lower half of the beam 28 is made white in color and is graduated in a price-scale representing price per pound, ranging from three cents to twenty-five cents a pound. This scale will hereinafter be referred to as the "white price-beam." The upper half of the beam is made red and is graduated to represent price per pound, ranging from twenty-six cents to one dollar per pound, and will hereinafter be referred to as the "red price-beam." The weight 69 is marked "10" on its side, and, as heretofore described, balances ten pounds on the platform when it is hung on the counterpoise 30, has "25" on one side colored white and "100" on the other side colored red, and is taken as the standard unit in determining the exact point of graduation of the "25" (cents) point on the white and the "100" (cents) point on the red scale, (the two points being one above the other.) In other words, when the maker of the scale desires to determine the above points on the beam 28 he places an article weighing one pound on the platform of the scale, places the "10" weight (shown in Figs. 5, 6, and 7) on the holder 41, and then turns the handle 58, thereby rotating the compound worm, and thus moves the counterpoise 31 along the beam 28 until the scale balances, when the desired graduation is made upon the beam. In order to mark the other graduations on the red beam and the white beam, I leave the value-weight 67, above described, upon the counterpoise 41 and place upon the platform of the scale an amount of material to be weighed, which, at the desired price per pound, will cost twenty-five cents or one dollar, as the case may be. I now move the counterpoise 31, as heretofore described, until the scale balances, and mark the new point on the red and the white scale. The weight 67 having "20" on its edge and balancing twenty pounds when it is on poise 30, is marked on its white face "50" and on its red face "2.00." In the same way the value-weight marked "30" on the edge has "75" and "300" on its respective faces and the price-weight marked "40" on the edge has "100" and "400," respectively, on its sides, and so on. In other words, these value-weights are even multiples of the "10-25-100" weight shown in Figs. 5, 6, and 7. The ratio of four to one between the red and white scales and the corresponding markings on the faces of the above value-weights is purely arbitrary, and a different ratio may be used, if desired, in graduating and marking the parts.

The auxiliary scale-bar 30 of the value-beam 60 is made at such an angle to the arms 61 and 62 and the poise 66 is made of such a size that with the "10-25-100" value-weight shown in Figs. 5, 6, and 7 on the price-poise 41 and the slide 31 at the inner end of the beam 28—that is, at the "100-25" graduation—the poise 66 will be in the position shown in Fig. 1 at the zero of the scale, and when the other parts remain in the same position and two pounds are put on the platform the poise 66 must be moved to the inner end of the bar 63 to bring the scale to balance. The upper half of this bar is colored red and the lower half white, and will hereinafter be described and designated, respectively, as the "red value-beam" and the "white value-beam." The point of balance above referred to is marked "100" on the red value-beam and the corresponding point "25" on the white value-beam. The distance between the "0" and the "100" mark on the red value-beam is divided into one hundred parts and marked as shown in Fig. 1, while the distance between "0" and "25" on the white value-beam is correspondingly divided, as shown.

In the commercial operation of my scale assume that the operator has an article which is worth twelve cents per pound and that, as a matter of fact, it weighs fourteen pounds, though at the time the operator does not know this. The operator first turns the handle 38 until the counterpoise 31, price-poise 41 being empty, stands at the mark "12" on the white beam, with the remaining movable parts in the position shown in Fig. 1. He then tries the scale and finds that it balances. He now places the goods to be weighed upon the platform and the detachable value-weights 67, white face up, on the poise 41 until he approximates a balance, the end of beam 28 pointing upward. When this is done, he moves poise 66 on beam 63 until the scale comes to a balance. He then adds together the white-face readings of the value-weights on the price-poise 41 and the reading of the white value-beam, and the result is the total price in cents of the article weighed. In this particular case the operator should have on the poise 41 the value-weight marked in white "100" and another marked "50," while the poise 66 should indicate "18" on the white value-beam, making a total of one hundred and sixty-eight cents, or one dollar and sixty-eight cents. If the price of the article to be weighed is more than twenty-five cents and less than one dollar a pound, the operator sets the counterpoise 31 to the desired price on the red beam, turns the value-weights, red face up, takes his final reading from the red value-beam, and obtains his result by a similar process. Assume now that a purchaser wishes to buy goods worth thirteen cents a pound to the amount of thirty-seven cents. The salesman sets the price-counterpoise 31 at the "13" mark on the white beam, as heretofore described, places the value-weight 67 having "25" on its white face, with that face up, on poise 41, and moves poise 66 out until it indicates "12" on the white value-beam. He then places enough of the articles to be sold on the platform to balance the scale. If the price of the article to be purchased had been more than twenty-five cents a pound, the salesman would have simply used the red markings on the beams instead of the white. If it is desired to deduct the known weight of a receptacle from the gross weight of both goods and receptacle, the tare-poise 55 may be moved out on beam 54 until it indicates the weight of the receptacle, when the result indicated by the scale will be a net result.

In practice it is not found worth while to use the computing-scale where the total cost of an article is less than twenty-five cents, so that I prefer to make this my minimum unit on the weights, though the scale may be calibrated to smaller units, if desired, as shown in Fig. 1, where the value-beam is graduated as low as one cent.

I do not limit myself to the size, shape, color, markings, or materials of the scale described. These may be varied within wide limits without departing from my invention. I sometimes calibrate my price-beam and my tare-beam on both sides and put a face upon the angular value-beam at the rear, so that readings may be taken on my scale from either side.

Having thus described my invention, what I claim as new, and desire to secure by Letters Patent, is—

1. In a computing-scale, a balanced price-beam graduated in units of price, a movable price-poise mounted on said price-beam adapted to carry weights denoting value, means for counterbalancing said price-poise when empty in all positions on said price-beam, an independently-balanced value-beam graduated in units of value connected to and controlling said price-beam, a movable value-poise mounted on said value-beam, said weights so sealed and said value and price beams so calibrated that the sum of the units of weight indicated at a balance by said value-weights and said value beam and poise denotes the value of the load weighed at the price indicated by the price beam and poise.

2. In a computing-scale, the combination of a price-beam, a price-poise adapted to slide along said beam, means for detachably securing value-weights to said price-poise, graduations on the price-beam representing price per unit of weight, a value-beam pivoted independently at an angle to said price-beam and adapted to control the price-beam through the sliding price-poise, a value-poise upon said value-beam, a graduated scale upon said value-beam adapted, in all positions of the price-poise upon the price-beam, to read directly in units of money the value of the part of the article weighed which is in excess of the portion represented by the value-weights upon the price-poise.

3. In a computing-scale, the combination of a price-beam graduated to represent prices per unit of weight, a value-weight-carrying slide or price-poise upon said beam, an angular beam pivoted at one side of the price-beam and extending through the vertical plane of said price-beam, a connection between the angular beam and the price-poise adapted to give the angular beam control of the price-beam in all positions of the price-poise, an angular scale-bar upon the angular beam, a poise upon said angular bar and graduations upon said scale-bar, the proportions of the various parts and the angle of the angular bar being such that when the apparatus is brought to a balance said divisions on the angular beam indicate in units of money the value of the portion of the load being weighed which is in excess of the portion of said load which is represented by the value-weights upon the price-poise.

4. The combination of an angular beam 60 adapted to be pivoted at one side of the price-beam of a computing-scale, means for connecting said angular beam to the price-poise of the scale in all positions of said price-poise, an angular scale-bar 63 on said angular beam, a poise 66 upon said bar 63 and graduations upon said bar representing value in units of money, for the purposes set forth.

5. In a computing-scale, the combination of a base adapted to be secured to the upright of ordinary platform counter-scales, a price-beam pivoted to said base, a price-poise upon one end of said price-beam, a counterweight upon the other end of said beam, means for moving said poise and said counterweight in opposite directions at such rates of speed that the scales will balance in all positions of the empty poise on the beam, means for detachably securing value-weights to the price-poise, means for connecting the counterweighted end of the price-beam to the mechanism of the weighing-platform and two scales upon the price-beam, one graduated to represent prices per unit of weight (with a given unitary value-weight on the price-poise) and the other scale graduated to represent multiples of said prices, substantially as described.

6. In a computing-scale, the combination of a base adapted to be secured to the upright of ordinary platform counter-scales, a price-beam pivoted to said base, a price-poise upon one end of said price-beam, a counterweight upon the other end of said beam, means for moving said poise and said counterweight in opposite directions at such rates of speed that the scales will balance in all positions of the empty poise on the beam, means for detachably securing value-weights to the price-poise, means for connecting the counterweighted end of the price-beam to the mechanism of the weighing-platform, two scales upon the price-beam, one graduated to represent prices per unit of weight with a given unitary value-weight on the price-poise and the other scale graduated to represent multiples of said prices, an auxiliary beam or lever adapted to control the price-beam through the price-poise in all its positions, and a graduated scale with its poise upon said auxiliary lever, adapted when the apparatus is brought to balance to indicate in units of money the value of the portion of the load to be weighed which is in excess of the portion of said load which is represented by the value-weights upon the price-poise, substantially as described.

7. In combination with a computing-scale having a price-beam bearing graduated scales of two colors, the one adapted to indicate prices per unit of weight of the article to be weighed and the other to indicate multiples thereof, and having a price-poise adapted to slide upon said price-beam and having means for detachably securing value-weights to the price-poise, a value-weight adapted to be secured to the price-poise having one side colored and value indications thereon to correspond with one of the scales on the price-beam and the other side colored and value indications thereon to correspond with the other scale on the price-beam, substantially as described.

8. In a computing-scale, the combination of a price-beam, a price-poise adapted to slide thereon, means for automatically counterweighting said price-poise, means for detachably securing a value-weight to said price-poise, a colored scale graduated on said price-beam to represent prices from a small number up to a certain number, a different-colored scale on said price-beam graduated to represent multiples of the first scale, one or more units-of-value weights adapted to be attached to the price-poise having one side numbered and colored to correspond to one of said scales and the other side numbered and colored to correspond to the other scale, an auxiliary lever or beam adapted to control the price-beam through the price-poise, two scales on the auxiliary beam colored respectively to correspond with the scales on the price-beam, and graduations on said auxiliary scales indicating in units of money the value of the portion of the load to be weighed which is in excess of the portion represented by the total value of the value-weights of the same color on the price-poise, substantially as described.

9. In a computing-scale, the combination of a price-beam, a counterweight adapted to slide thereon, a |⎯|-piece secured to the lower edge of the beam of such dimensions that the counterweight may slide freely past it, and knife-edge bearings on the sides of said ⌐⌐-piece, substantially as described for the purposes set forth.

10. In a computing-scale, a price-beam graduated in scales of two colors, one adapted to indicate price per unit of weight of the article to be weighed and the other multiples thereof, a price-poise slidably mounted thereon with means for detachably securing value-weights, said value-weights having one face colored and value indications thereon to correspond with one of said scales and the other face colored and value indications thereon to correspond with the other of said scales and a number on the edge thereof indicating the amount in units of weight which said value-weight will balance.

THOMAS L. TINCHER.

Witnesses:
H. E. CLAPPER,
T. LANDERBAUGH.